(No Model.)
J. V. WORTHINGTON & J. GEHR.
SINGLETREE.
No. 441,916. Patented Dec. 2, 1890.
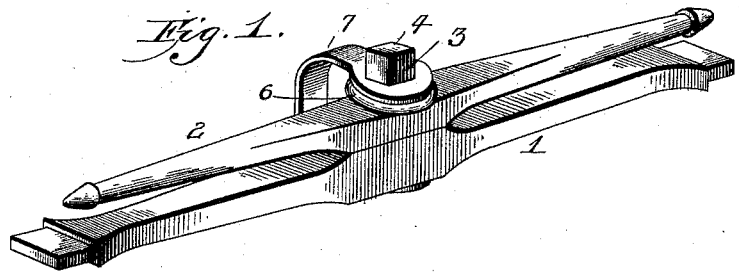
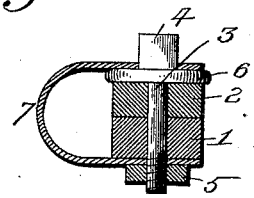
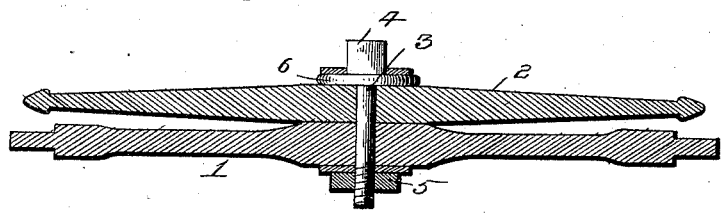

UNITED STATES PATENT OFFICE.

JOHN V. WORTHINGTON AND JOHN GEHR, OF CLEAR SPRING, MARYLAND.

SINGLETREE.

SPECIFICATION forming part of Letters Patent No. 441,916, dated December 2, 1890.

Application filed September 6, 1890. Serial No. 364,157. (No model.)

*To all whom it may concern:*

Be it known that we, JOHN V. WORTHINGTON and JOHN GEHR, both residents of Clear Spring, in the county of Washington and State of Maryland, have invented certain new and useful Improvements in Singletrees; and we do hereby declare that the following is a full, clear, and exact description of the invention, which will enable others skilled in the art to which it appertains to make and use the same, reference being had to the accompanying drawings, which form a part of this specification.

Our invention relates to improvements in devices for connecting singletrees with the cross-bars of buggies and other light vehicles.

The usual method of connecting a singletree with its cross-bar is by means of an ordinary headed bolt and a nut. This is very objectionable, owing to the tendency of the bolt to work loose, allowing the singletree to wabble, causing rattling thereof.

The object of our invention is to remedy the above defects and provide a simple and economical connection for singletrees and cross-bars which will effectually hold the same in proper position and prevent rattling of the singletree.

The invention consists in the novel construction and combination of parts hereinafter fully described, and specifically pointed out in the claim.

In the accompanying drawings, Figure 1 is a perspective view of a cross-bar and singletree, showing our invention applied thereto. Fig. 2 is a transverse sectional view, and Fig. 3 a longitudinal section.

In the said drawings, the reference-numeral 1 designates the cross-bar, which is attached to the shafts, as usual, and 2 is the singletree. Both of these parts are of any ordinary or suitable construction, and are provided with central apertures for the passage of a retaining-bolt 3. This bolt consists of a round metal bar having a square or angular head 4, and may be provided at its lower end with screw-threads to engage with a binding-nut 5. This nut, however, is not essential, and may be dispensed with, if desired. Intermediate of this round portion of the bolt and its squared or angular head 4 is an annular flange 6. This flange is preferably made integral with the bolt, or it may consist of a metal disk perforated in the center for the passage of the bolt and firmly fixed thereto.

The numeral 7 designates a strong curved spring, preferably made of steel, and having one of its ends provided with a square or angular aperture corresponding in shape with the angular head 4 of the bolt which passes therethrough. The other end of the spring is provided with a circular opening or aperture for the passage of the lower end of the bolt.

The manner of applying and using our improved device will be readily understood from the above description, taken in connection with the accompanying drawings, and it will be obvious that the tension of the spring will keep the singletree and cross-bar in close contact and prevent wabbling and rattling, the ends of said spring bearing, respectively, against the under side of the cross-bar and the flange upon the bolt.

The object of the angular head 4 is to prevent the bolt from turning when a binding-nut is employed in connection with the bolt, and when said nut is dispensed with the said head may be made circular, if desired.

Having thus described our invention, what we claim is—

The combination, with a singletree and a cross-bar having central apertures, and a curved spring, one end of which is provided with an angular and the other with a circular aperture, of a bolt consisting of a round screw-threaded bar having an angular head and an intermediate annular flange, the said head passing through the angular aperture in the spring and the round portion passing through the circular aperture therein, and a binding-nut fitting in the screw-threaded end of the bolt, substantially as described.

In testimony that we claim the foregoing as our own we have hereunto affixed our signatures in presence of two witnesses.

JOHN V. WORTHINGTON.
JOHN GEHR.

Witnesses:
O. K. BOVEY,
EDWARDS YORDELL.